May 11, 1937.  D. SENSAUD DE LAVAUD  2,080,199
HYDRAULIC DEVICE FOR THE TRANSMISSION OF MOVEMENT
Filed Feb. 13, 1934   3 Sheets-Sheet 3
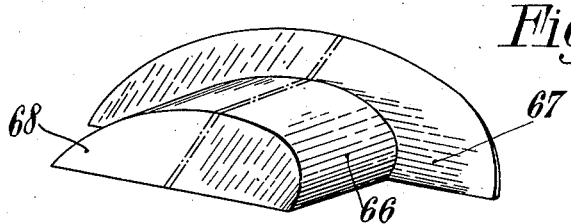
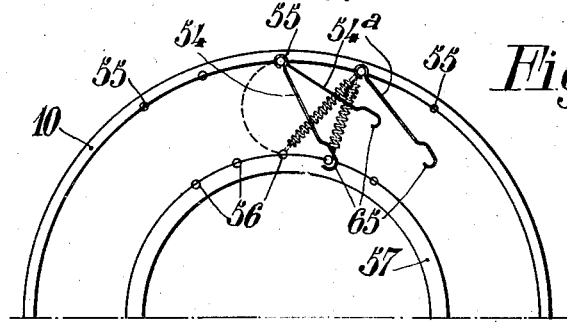
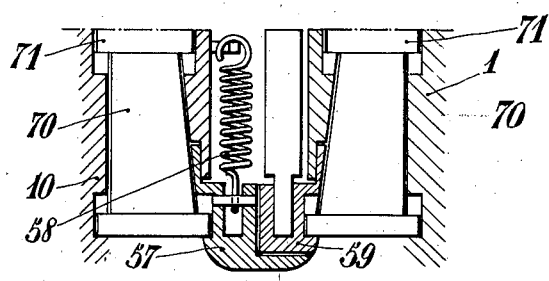
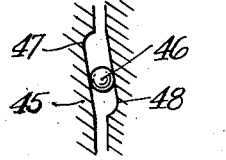
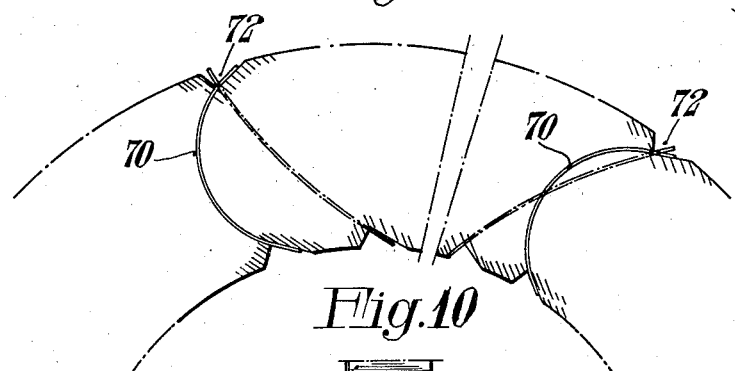
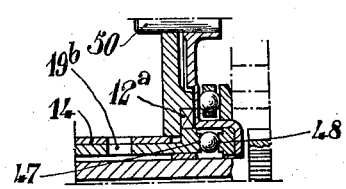

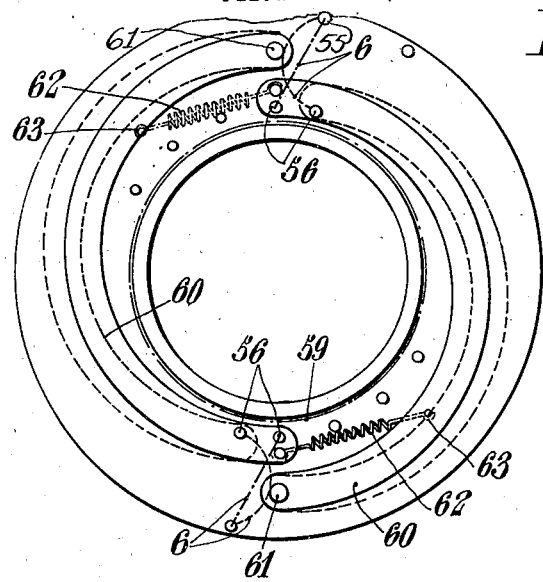
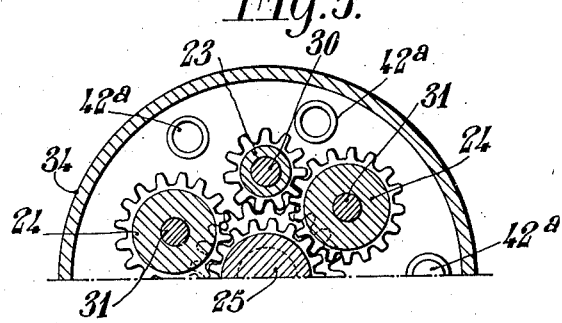
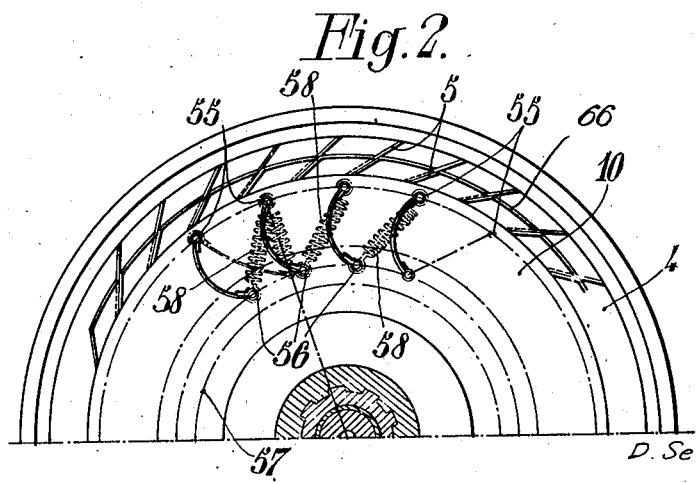

Patented May 11, 1937

2,080,199

UNITED STATES PATENT OFFICE 2,080,199

HYDRAULIC DEVICE FOR THE TRANS-MISSION OF MOVEMENT

Dimitri Sensaud de Lavaud, Paris, France

Application February 13, 1934, Serial No. 711,057
In France February 18, 1933

11 Claims. (Cl. 60—54)

Hydraulic devices for the transmission of movement are already known comprising a pump keyed on the driving shaft and a turbine keyed on the driven shaft and arranged coaxially. These devices known under the name of Föttinger's coupling have the great drawback of only functioning under suitable conditions of efficiency for a well-defined ratio of speed between the driving and driven shafts.

In order to overcome this drawback and to permit the transmission with a good efficiency between the driving and driven shafts regardless of the speeds of these shafts, it has already been proposed to insert in the hydraulic circuit of a Föttinger transmission gear a circular ring provided with blades and arranged coaxially to the turbine and pump.

This circular ring has for its object to receive the fluid at the outlet of the turbine or secondary wheel for example and to guide it in such a manner that it will enter the blades of the pump at a suitable angle so that the remaining energy in this fluid is restored on the blades of the said pump or primary wheel.

It is obvious that owing to the fact that the speeds of rotation of the turbine and pump vary constantly, the inlet and outlet angles of the fluid of the various blades must vary if it is desired to obtain at every instant the optimum efficiency.

It has already been proposed in connection with such devices to articulate a part of the blading of the guide vane ring but this has led to a complex and imperfect solution for assuming that the blades of one of the members (pump or turbine) are fixed, the blades of the other members (turbine or pump and guide vane ring) must have angles which vary at the inlet and at the outlet.

The present invention is adapted to comply with these various conditions and, for that purpose, it is characterized by the fact that the vanes of the pump and guide vane ring are constituted by blades flexible throughout their length and mounted at one end on the shell of the pump or turbine and at the other end on a crown movable relatively to the said shell in opposition to resilient returning devices so that the distortion of the blades is produced by the liquid thrust with regard to the vanes of the guide vane ring and by the speed of rotation of the pump with regard to the vanes of the latter.

The present invention further relates to a number of particular points which will appear from the following description with reference to the accompanying drawings, given by way of example only, in which:

Fig. 2 is a partial section made according to line II—II of Fig. 1, showing the blades of the guide vane ring and those of the turbine.

Fig. 3 is a partial section made according to line III—III of Fig. 1, showing the blades of the pump and their actuating members.

Fig. 5 is a partial section made according to line V—V of Fig. 1, showing the gear transmission for reverse drive.

Fig. 6 is a partial section showing a constructional modification of the blades of the guide vane ring.

Fig. 7 is a detail perspective view, on an enlarged scale, showing a form of construction of the blades of the turbine, the blade being cut according to a median plane in order to show its cross section.

Fig. 8 is a longitudinal section, on an enlarged scale, showing a modification in the assemblage of the flexible blades of the pump and guide vane ring.

Fig. 9 is a side view corresponding to Fig. 8.

Fig. 10 is a sketch of a modification of Fig. 1 showing the guide vane ring connected to the frame by a free wheel.

Fig. 11 is a detail view showing conical inclines.

Fig. 12 shows diagrammatically in section a construction form of a flexible blade, in which one of the bent parts extends throughout the length of the said blade.

Figure 1:
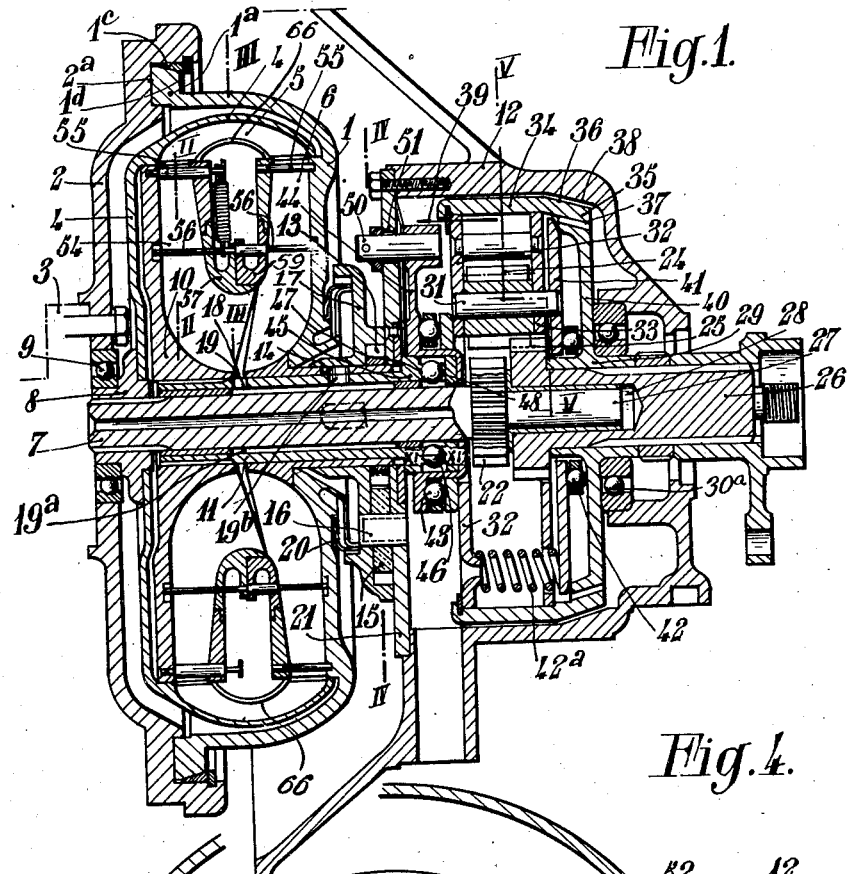
Fig. 1 is a longitudinal section of a form of construction of a hydraulic power-transmitting device according to the invention.
Figure 4:
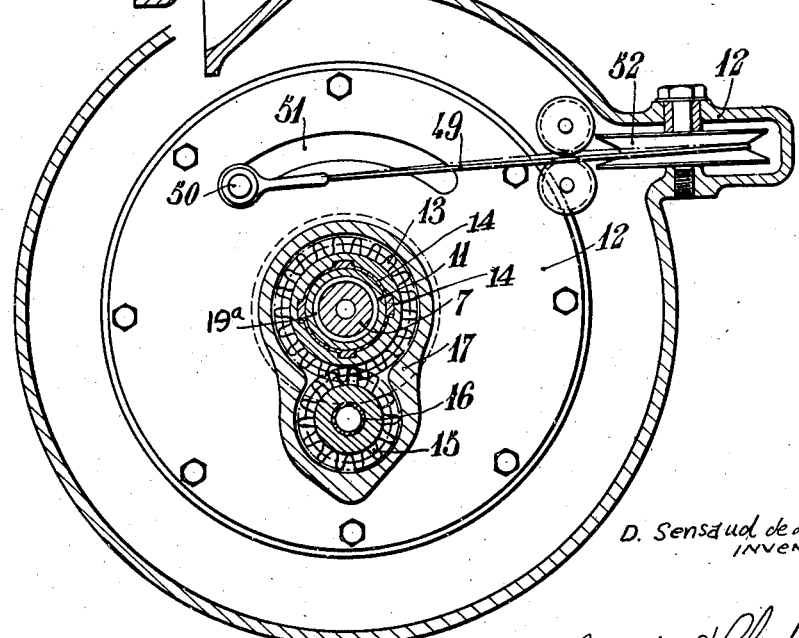
Fig. 4 is a section made according to line IV—IV of Fig. 1, showing in greater detail the device controlling the reverse drive.

Referring to Fig. 1, it will be seen that the hydraulic device comprises a pump $I$, which is rigid with a plate 2 fast on the driving shaft 3. The shell of the pump $I$ includes two semi-shells one of which is constituted by the plate 2. This plate 2 is provided with an annular groove $2^a$ in which engages a circumferential flange $I^a$ forming part of the shell of the pump $I$. The peripheral face of the flange $I^a$ is tapered and a conical ring $I^c$ is engaged between the flange $I^a$ and the external face of the annular groove $2^a$. This ring $I^c$ is held by a slit ring $I^d$ engaged in an annular groove provided in the plate 2. A turbine 4, of semi-toroidal shape, is arranged concentric with the pump $I$; the blades 5 of this turbine are located at the outlet side of the blades 6 of the pump $I$, the outlet of the blades 5 being at the same distance from the axis of rotation as the inlet of said blades. This turbine 4 is keyed on a shaft 7 through the medium of a hub 8 rigid with the shell of the turbine 4 and which is centered on the plate 2 by means of a ball bearing 9. A guide vane ring 10, the inner shape of which is identical to that of the pump, is keyed on a socket or sleeve 11 which is rigid, in the example illustrated, with the frame 12 of the entire device. The said guide vane ring 10 may be connected to the frame 12 through the medium of a free wheel 12a or the like arranged in such a manner that the guide vane ring 10 cannot rotate relatively to this frame 12 when the thrust of the fluid on the blades of this guide vane ring tends to rotate the latter in a direction opposite to the direction of the rotation of the pump 1 (see Fig. 10). Alternately the guide vane ring might be connected to the frame 12 through the medium of a suitable device, a friction device for instance, controlled by hand or automatically from any suitable member or both in combination. The guide vane ring 10 is arranged between the outlet side of the blades 5 of the turbine 4 and the inlet to the blades 6 of the pump 1. A gear pump has one of its wheels 13 keyed on a socket or sleeve 14 rotatively driven by the pump 1, the other toothed wheel 15 being loosely mounted on a shaft 16 secured to the frame 12 of the device. Both these toothed wheels are arranged within a gear case 17 secured to cheek member 21 rigid with the frame 12. The delivery of the fluid, from the pump, takes place at the central part, between the guide vane ring 10 and the pump 1, through an opening 18 and a space 19 left between these two apparatus. The delivery of the fluid in the annular space 19a left between the shaft 7 and the socket 11 takes place through openings 19b provided in the socket 11 and in the socket 14 and through axial grooves provided in the hub of the gear case 17, these grooves entering the outlet of the pump. Fluid-tight packings are provided at all suitable places, and more particularly between the various sleeves and the shaft 7, and between the shell of the pump 1 and the gear case 17 rigid with the frame 12, this latter packing being preferably constituted by a "floating" packing 20. The liquid, after passage between the teeth of the gears 13 and 15, enters a cavity made in the casing 17 of the pump, which cavity is prolonged parallel to the axis of the shaft 7 by longitudinal grooves formed in the thickness of the boss of said casing to the height of the openings 19b made in the sleeve 11 and the sleeve 14. These perforations 19b come, on account of the relative rotation of the sleeve 11 (rigid with the guide vane ring) and of the sleeve 14 (rigid with the pump), to register the one with the other and at this moment the fluid under pressure coming from the pump may reach the annular space 19a.

On the end of the shaft 7 is secured a toothed pinion 22 meshing with a number of planet pinions 23 (Fig. 5) in engagement with planet pinions 24 which, in their turn, mesh with a toothed pinion 25 rigid with the shaft 26, as more clearly illustrated in Fig. 5. The shaft 7 carries a projection 27 which enters a bore 28 of the driven shaft 26, which is rigid with a socket 29 journalled, through the medium of a ball bearing 30a, on the frame 12. The planet pinions 23 and 24 are loosely mounted on shafts 30 and 31, respectively, journalled in side cheek members 32 and 33. These cheek members are rigid, at their periphery, with a drum 34 terminating in a frustum-shaped portion 35 which can carry, on its outer and inner faces, respectively, suitable brake linings. Opposite the outer face 36, a conical part 38 is provided on the frame 12, and this outer face 36 can come in engagement with this part 38 by a displacement of the entire structure in a direction reverse to that indicated by the arrow 39. By a displacement in the direction of the arrow, the inner face 37 of the drum can come in engagement with the frustum-shaped periphery of a cheek member 40 rigid with the socket 29, which latter is itself rigid with the driven shaft 26. The cheek members 32 and 33 are angularly rigid with a disc 41, through the medium of the shafts 30 and 31 of the planet pinions. This disc 41 is fixed in axial position through the medium of a ball abutment 42 bearing on the cheek member 40 rigid with the driven shaft 26. The cheek member 32 bears upon the disc 41 through the medium of springs 42a which tend to push back this cheek member and the parts rigid therewith in the direction of the arrow 39, thus causing the inner face 37 of the drum to come in engagement with the periphery of the cheek member 40. The cheek member 32 bears, on its other face, through the medium of a ball abutment 43, on a disc 44 which, in its turn, bears upon a part 45 rigid with the frame 12 of the device, through an adjustable abutment. This abutment is constituted by balls, rollers or the like 46 moving on conical inclines 47 and 48 provided on the fixed part 45 of the frame and on the disc 44, respectively. It will therefore be seen that, by a suitable rotation of the disc 44, the latter, and consequently the cheek member 32 and its associated parts, are moved away to a greater or less extent in opposition to the action of the springs 42a. The rotation of the disc 44 is obtained by acting, by means of a cable 49, on a shaft 50, rigid with the disc and passing through an opening 51 of the frame 12. The cable 49 is suitably guided by guide rollers 52 mounted on the frame 12 of the device.

It will be seen that, by means of such a device, the driven shaft can be caused to rotate in the same direction or in a direction reverse to that of the driving shaft. In fact, if the drum 34, rigid with the cheek members 32 and 33 on which the planet pinions are mounted, is in engagement with the disc 40, a key-like connection is obtained between the driving and driven shafts. On the contrary, if the drum 34 is in engagement with the conical part 38 of the frame 12, the driven shaft is actuated in a direction reverse to that of the driving shaft and with a gearing down ratio depending on the pinions employed. If the drum 34 is in an intermediate position, the driven shaft remains stationary.

The assemblage of the flexible blades 6 of the pump 1, illustrated in greater detail in Fig. 3, as well as the assemblage of the flexible blades 54 of the guide vane ring 10, illustrated in greater detail in Fig. 2, are effected in a similar manner. The peripheral end of each of the blades is mounted on a pin 55 secured to the shell of the corresponding element, whilst the other end is mounted on a pin 56 secured to a crown movable relatively to the shell of the member under consideration and arranged in a groove of said shell. The movable crown 57, mounted on the shell of the guide vane ring 10, is connected, by springs 58, to said shell. These springs 58 are so arranged that the distortion of the blades, under the action of the thrust of the fluid, takes place in opposition to the tension of the springs 58.

The two movable members 60 are identical and in what follows the functioning and the mounting of but one is described. Member 60 is mounted at one of its extremities about an axis 61 (Fig. 3) which is fixed on the shell of the pump. At its extremity, the member 60 carries a teat which engages in a recess of the movable crown 59 in such a way that when the members 60 pivot about the axis 61 the teat draws in the rotation the movable crown 59, each of the members 60, being pivoted around an axis 61 which is not in its center of gravity, pivots under the action of the centrifugal force created by rotation of the pump in opposition to the tension of the spring 62 anchored by a pin 63 to the pump shaft to an extent which is a function of the velocity of rotation. It is clear then that the rotation of the movable crown 59 will also be a function of this velocity of rotation.

Also the blades of the pump are fixed at one of their extremities to the shell of the pump and at the other extremity to the movable crown 59 which may displace itself angularly with respect to this shell. It being understood that in repose each of the blades is inclined relatively to a radial direction, when the movable crown 59 turns leaving its position of repose, in such a way as to tend to draw the two axes of articulation of the blade over a radius, the distance between the two axes diminishes and by virtue of the fact that the blade is of a constant length it is consequently obliged to bend to an extent which will be as much greater as the rotation of the crown from its position of repose to the position in which the two axes or pivots at fixation of each of the blades are on a same radius, is greater.

Each of the vanes of the pump 1 and guide vane ring 10 is constituted by a flexible blade (spring steel for instance) the ends of which are so bent as to constitute sockets into which fit the pins on which these vanes are mounted. The bent portions thus constituted are preferably riveted or welded to the body of the vane so as to prevent them from being lifted under the action of the thrust of the fluid. Moreover, one of the bent portions can extend throughout the length of the vane for increasing the resistance of the latter as shown diagrammatically in Fig. 12.

In the form of construction illustrated in Fig. 6 and relating to a flexible vane 54 of the guide vane ring 10, this vane 54, mounted on a spindle 55 rigid with the shell of the guide vane ring 10, as already described, has, at its other end, an open loop 65. This loop normally fits on to the spindle 56 rigid with the movable crown 57 when the fluid acts on the vane.

When the device operates as a hydraulic coupling, that is to say when the pump and the turbine rotate at the same speed, the vane then disengages from the spindle 56 and moves to the position shown at 54ᵃ in the path of the fluid circulating within the hydraulic device.

Figure 7 is a perspective view of a vane 5 of the turbine. According to the invention, this vane 5 is composed of a wall 66 substantially cylindrical whose axis, when the vane is fixed on the shell 4 of the turbine, is orthogonal to the axis common to the driving and driven shafts (3 and 26) of the hydraulic device in such manner that the said wall 66 forms an inner toroidal part of the wall constituted by the circuit of the fluid as shown at 66 in Fig. 1. The said wall 66 is prolonged laterally by two cheek members 67 and 68 disposed radially, that is to say, extending in planes passing through the axis common to the driving and driven shafts. The cheek member 67 having a substantially circular external contour is adapted to the inner wall of the shell 4 of the turbine and extends toward the exterior from one of the sides of the cylindrical wall 66. The other cheek member 68 in the form of a circular segment extends toward the interior from the other side of the said cylindrical wall 66 and serves for stiffening the vane. It will be easily understood that the cheek member 67 serves as a vane proper of the turbine and also for securing the vane on the shell 4 of this turbine by electric welding for instance.

In the constructional modification of the flexible vanes of the pump and of the guide vane ring, and illustrated in Figs. 8 and 9, only one of the vanes will be described, these vanes being identical for the pump and the guide vane ring. Each vane is composed of the body 70 of the vane proper. At each of the ends are provided side projections 71 extending into V-shaped notches 72 provided respectively in the shell of the corresponding member and in the movable crown mounted on this member. It will be seen that, when the vanes of the guide vane ring become distorted under the action of the thrust of the fluid, they cause the movable crown of this guide vane ring to rotate; on the contrary, when the movable crown of the pump moves under the action of centrifugal force acting on the actuating members 60, it causes the distortion of the vanes as explained above and as shown in Fig. 9. The assemblage remains the same as in the form of construction previously described. It will be seen that, by the use of such vanes, the losses by friction on the cylindrical portions of the vanes serving to secure the latter on the pivot pins are eliminated. Moreover, and owing to the reduced thickness of these vanes, it is possible to increase the number of the same, without reducing the total section of the passageway for the fluid and, consequently, to obtain a better guiding action, a better orientation of the fluid streams and, therefore, a better efficiency.

The invention is not limited to the forms of construction described above and illustrated, but it includes in its scope all those utilizing the characteristic features above mentioned and allowing to obtain the desired result.

What I claim as my invention and desire to secure by Letters Patent is:

1. In a hydraulic transmission, a rotary pump, a turbine operated by the fluid discharged from the pump and arranged to return the fluid to the pump, a guide vane ring between said two devices, the pump, the turbine and the guide vane ring being coaxial with one another, a crown angularly movable relatively to the shell of said guide vane ring, resilient means connecting said crown to the shell of said guide vane ring and acting in opposition to the action of the thrust of the fluid, vanes constituted by blades flexible throughout their length and secured, on the one hand, on the shell of the guide vane ring and, on the other hand, on the said movable crown.

2. In a hydraulic transmission, a rotary pump, a first crown angularly movable relatively to the shell of said pump, first resilient means connecting said first crown to the shell of said pump, actuating members subjected to the action of centrifugal force and acting on said first movable crown in opposition to the action of said first resilient means, first vanes constituted by flexible blades secured, on the one hand, on the shell of the pump and, on the other hand, on said first movable crown, a turbine operated by the fluid discharged from the pump and arranged to return the fluid to the pump; a guide vane ring between said two devices, the pump, the turbine and the guide vane ring being co-axial with one another, a second crown angularly movable relatively to the shell of said guide vane ring, second resilient means connecting said second crown to the shell of said guide vane ring and acting in opposition to the thrust of the fluid, second vanes constituted by flexible blades secured, on the one hand, on the shell of the guide vane ring and, on the other hand, on said second movable crown.

3. In the hydraulic transmission according to claim 2, the said first crown movable relatively to the shell of the pump being arranged on the said shell at the point where the fluid enters the said pump while the said second crown movable relatively to the shell of the guide vane ring is arranged on the said shell at the point where the fluid passes out of the said guide vane ring.

4. In the hydraulic transmission according to claim 2, a first series of pins rigid with the shell of the said pump, a second series of pins rigid with the said first crown movable relatively to the shell of the said pump, the ends of the first flexible blades being bent down to engage with the pins of the said first and second series of pins, a third series of pins rigid with the shell of the said guide vane ring, a fourth series of pins rigid with the said second crown movable relatively to the shell of the said guide vane ring, the ends of the second flexible blades being bent down to engage with the pins of the third and fourth series of pins.

5. In the hydraulic transmission according to claim 2, a first series of pins rigid with the shell of the said pump, a second series of pins rigid with the said first crown movable relatively to the shell of the said pump, the ends of the first flexible blades being bent down to engage with the pins of the said first and second series of pins, one of the bent ends extending throughout the length of the said blades, a third series of pins rigid with the shell of the said guide vane ring, a fourth series of pins rigid with the said second crown movable relatively to the shell of the said guide vane ring, the ends of the second flexible blades being bent down to engage with the pins of the said third and fourth series of pins, one of the bent ends of the second blades extending throughout the length of the said blades.

6. In the hydraulic transmission according to claim 2, a first series of pins rigid with the shell of the said pump, a second series of pins rigid with the said first crown movable relatively to the shell of the said pump, the ends of the first flexible blades being bent down to engage with the pins of the said first and second series of pins, one of the ends being bent in the form of a hook, a third series of pins rigid with the shell of the said guide vane ring, a fourth series of pins rigid with the said second crown movable relatively to the shell of the said guide vane ring, the ends of the second flexible blades being bent down to engage with the pins of the said third and fourth series of pins.

7. In the hydraulic transmission according to claim 2, recesses provided in the shells of the pump and guide vane ring as well as in the said first and second movable crowns, side projections provided at both ends of said first and second vanes for respectively extending in said recesses, the distance between said projections being such that it allows suitable distortion of these vanes by permitting a relative rotation between the shell and the corresponding movable crown.

8. In the hydraulic transmission according to claim 2, the shell of the pump constituted by two half-shells, a conical ring constituting a packing interposed between both half-shells, the conicity of the ring being such that when both half-shells tend to spread apart under the action of the pressure of the fluid, the fluid-tightness between said ring and the two half-shells is increased.

9. In the hydraulic transmission according to claim 2, the turbine arranged at the periphery so that the inlet and outlet of the blades of said turbine are at the same distance from the axis of rotation common to the pump, to the turbine, and to the guide vane ring.

10. In the hydraulic transmission according to claim 2, the blades of the turbine being each constituted by an approximately cylindrical wall, the axis of which is at right angles to that of the driving and driven shafts and which is extended laterally through two radially disposed cheek members, one of which with an approximately circular external contour extends to the exterior from one of the sides of the said cylindrical wall while the other in the form of a circular segment extends to the interior from the other side of the said cylindrical wall.

11. In the hydraulic transmission according to claim 2, the first and second vanes having a width decreasing from the center to the periphery.

DIMITRI SENSAUD DE LAVAUD.